United States Patent
Okanojo et al.

(10) Patent No.: US 12,505,904 B2
(45) Date of Patent: Dec. 23, 2025

(54) INFORMATION MANAGEMENT APPARATUS AND NON-TRANSITORY COMPUTER-READABLE RECORDING MEDIUM

(71) Applicants: PHC Corporation, Ehime (JP); National Cancer Center, Tokyo (JP)

(72) Inventors: Masahiro Okanojo, Tokyo (JP); Tatsuya Matsuno, Tokyo (JP); Mao Kameda, Tokyo (JP); Yushi Sato, Tokyo (JP); Shangwu Chen, Tokyo (JP); Yuma Suzuki, Tokyo (JP); Ryosuke Takahashi, Tokyo (JP); Tetsuya Nakatsura, Tokyo (JP)

(73) Assignees: NATIONAL CANCER CENTER, Tokyo (JP); PHC CORPORATION, Ehime (JP)

( * ) Notice: Subject to any disclaimer, the term of this patent is extended or adjusted under 35 U.S.C. 154(b) by 117 days.

(21) Appl. No.: 18/373,808

(22) Filed: Sep. 27, 2023

(65) Prior Publication Data
US 2024/0021281 A1    Jan. 18, 2024

Related U.S. Application Data

(63) Continuation of application No. PCT/JP2022/015130, filed on Mar. 28, 2022.

(30) Foreign Application Priority Data

Mar. 31, 2021    (JP) ................................. 2021-059960

(51) Int. Cl.
G16H 10/60    (2018.01)
G16H 50/70    (2018.01)

(52) U.S. Cl.
CPC ............. *G16H 10/60* (2018.01); *G16H 50/70* (2018.01)

(58) Field of Classification Search
CPC ........ G16H 10/60; G16H 50/70; G16H 20/00; G16H 40/00; G16H 10/40
See application file for complete search history.

(56) References Cited

U.S. PATENT DOCUMENTS

2004/0138822 A1\* 7/2004 Rambaud ............... G16H 10/40
702/19
2010/0273213 A1 10/2010 Mineno et al.
(Continued)

FOREIGN PATENT DOCUMENTS

WO        2008/153029 A1    12/2008
WO    WO-2019055896 A1 \*  3/2019    ......... A61K 39/0011
WO    WO-2020113098 A1 \*  6/2020    ............. G16H 20/00

OTHER PUBLICATIONS

Shahi S, Ang CS, Mathivanan S. A High-Resolution Mass Spectrometry-Based Quantitative Metabolomic Workflow Highlights Defects in 5-Fluorouracil Metabolism in Cancer Cells with Acquired Chemoresistance. Biology (Basel). May 6, 2020;9(5):96. doi: 10.3390/biology9050096. PMID: 32384705; PMCID: PMC7284906 (Year: 2020).\*

(Continued)

*Primary Examiner* — Sun M Li
(74) *Attorney, Agent, or Firm* — Rimon P.C.

(57) ABSTRACT

An information management apparatus includes at least one processor configured to acquire first time information and second time information, the first time information being related to a time taken to acquire a predetermined amount of at least one or more specific nucleic acids based on a first cell acquired from a cancer patient, the second time information being related to a time taken to culture a second cell different from the first cell until a predetermined amount is reached;

(Continued)

and store individual patient information in which the first time information and the second time information are associated with attribute information of the cancer patient.

15 Claims, 4 Drawing Sheets

(56) References Cited

U.S. PATENT DOCUMENTS

| | | | | |
|---|---|---|---|---|
| 2016/0122766 | A1* | 5/2016 | Wucherpfennig | C07K 14/7051 435/6.12 |
| 2018/0181709 | A1* | 6/2018 | Briggs | G16B 20/20 |
| 2019/0057762 | A1* | 2/2019 | Toyosaki | G16H 50/20 |
| 2019/0214147 | A1* | 7/2019 | Ariely | G16H 10/40 |
| 2020/0177386 | A1* | 6/2020 | Mahmood | H04L 63/102 |
| 2020/0268860 | A1* | 8/2020 | Susarchick | A61K 39/12 |
| 2021/0287805 | A1* | 9/2021 | Ko | G06N 3/08 |
| 2021/0319891 | A1* | 10/2021 | Ahmed | G16H 40/20 |
| 2022/0300787 | A1* | 9/2022 | Wall | G06N 3/0464 |
| 2023/0029915 | A1* | 2/2023 | Vladimirova | G16H 50/20 |

OTHER PUBLICATIONS

R. Kathiroli, R. RajaKumari and p. Gokulprasanth, "Diagnosis Of Diabetes Using Cascade Correlation And Artificial Neural Network," 2018 Tenth International Conference on Advanced Computing (ICoAC), Chennai, India, 2018, pp. 299-306, doi: 10.1109/ICoAC44903.2018.8939103. (Year: 2018).*

H. Valafar and F. Valafar, "Prediction of a patient's response to a specific drug treatment using artificial neural networks," IJCNN'99. International Joint Conference on Neural Networks. Proceedings (Cat. No. 99CH36339), Washington, DC, USA, 1999, pp. 3694-3697 vol.5, doi: 10.1109/IJCNN.1999.836271. (Year: 1999).*

P. Ghavami and K. Kapur, "Artificial neural network-enabled prognostics for patient health management," 2012 IEEE Conference on Prognostics and Health Management, Denver, CO, USA, 2012, pp. 1-8, doi: 10.1109/ICPHM.2012.6299521. (Year: 2012).*

N. G. Maity and S. Das, "Machine learning for improved diagnosis and prognosis in healthcare," 2017 IEEE Aerospace Conference, Big Sky, MT, USA, 2017, pp. 1-9, doi: 10.1109/AERO.2017.7943950. (Year: 2017).*

International Search Report dated Jun. 21, 2022 issued in International Patent Application No. PCT/JP2022/015130, with English translation.

Aug. 20, 2013, pp. 383-387, in particular, pp. 385-386, section "3) Gene-modified T cell therapy", non-official translation (Tahara, Hideaki. Adoptive immunotherapy. Japanese Journal of Clinical Medicine Skin malignant tumor—Latest research trends in Basic and clinical—. vol. 71. extra edition 4 (serial No. 1044). Nippon Rinshosha KK.) with English translation of ISR for PCT/JP2022/015130.

Extended European Search Report dated Jul. 30, 2024 issued in the corresponding European Patent Application No. 22780792.2.

Bruce L. Levine et al: "Global Manufacturing of CAR T Cell Therapy", Molecular Therapy—Methods&Clinical Development, vol. 4, Mar. 4, 2017(Mar. 4, 2017), pp. 92-101, XP055510414, GB ISSN:2329-0501, DOI:10.1016/j.omtm.2016.12.006.

* cited by examiner

| NAME OF CANCER PATIENT | AGE | CANCER TYPE | AMOUNT OF ACQUIRED T CELLS | STAGE | CHEMOTHERAPY | AMOUNT OF COLLECTED BLOOD | FIRST DETAILED TIME INFORMATION | SECOND DETAILED TIME INFORMATION | SECOND TIME INFORMATION |
|---|---|---|---|---|---|---|---|---|---|
| P1 | 25 | STOMACH CANCER | $10^5$ | 2 | Heavy | 400mL | 14 | 5 | 8 |
| P2 | 30 | LUNG CANCER | $10^4$ | 3 | Right | 400mL | 17 | 7 | 9 |
| P3 | 40 | STOMACH CANCER | $10^5$ | 1 | Non | 200mL | 15 | 6 | 8 |
| P4 | 43 | BILE DUCT CANCER | $10^8$ | 3 | Heavy | 400mL | 10 | 5 | 7 |
| P5 | 49 | COLORECTAL CANCER | $10^7$ | 4 | Heavy | 600mL | 16 | 6 | 6 |
| P6 | 54 | PANCREATIC CANCER | $10^8$ | 3 | Right | 600mL | 16 | 7 | 7 |
| P7 | 61 | COLORECTAL CANCER | $10^4$ | 3 | Heavy | 400mL | 21 | 9 | 10 |
| P8 | 78 | LUNG CANCER | $10^5$ | 4 | Right | 600mL | 20 | 9 | 12 |
| ... | ... | ... | ... | ... | ... | ... | ... | ... | ... |

FIG. 5

INFORMATION MANAGEMENT APPARATUS AND NON-TRANSITORY COMPUTER-READABLE RECORDING MEDIUM

CROSS-REFERENCE TO RELATED APPLICATIONS

This is a bypass continuation of PCT Application No. PCT/JP2022/015130, filed on Mar. 28, 2022, which claims priority to Japanese Patent Application No. 2021-059960, filed on Mar. 31, 2021. The contents of these applications are hereby incorporated by reference in their entireties.

TECHNICAL FIELD

The present disclosure relates to an information management apparatus and a non-transitory computer-readable recording medium.

BACKGROUND ART

Recently, studies have been actively conducted on so-called personalized medicine in which cancer patients with a cancer disease are subjected to treatments tailored to the individual cancer patients on the basis of cancer tissue sequence information. Examples of the personalized medicine for cancer include cancer immunotherapy using modified immune cells obtained by partially modifying base sequences (polynucleotide sequences) (such modified immune cells are hereinafter sometimes referred to as "base-sequence-modified immune cells" or "modified immune cells").

One known example of cancer immunotherapy using base-sequence-modified immune cells is a base-sequence-modified T cell therapy. In short, the base-sequence-modified T cell therapy is a therapy in which T cells are acquired from a cancer patient, base sequences of molecules (such as T cell receptors) that recognize cancer antigens are introduced into the T cells to modify the base sequences of the cells, and the cells with the modified base sequences are transfused back into the cancer patient. As a specific base-sequence-modified T cell therapy, for example, a T cell receptor (TCR) T cell therapy (TCR-T cell therapy) is disclosed in WO2008/153029.

SUMMARY OF INVENTION

Technical Problem

However, cancer immunotherapy as an example of personalized medicine using base-sequence-modified immune cells involves at least a step of synthesizing a large amount of base sequences of molecules (such as T cell receptors) that recognize cancer antigens and a step of culturing a large amount of cells to be modified, such as T cells. The time (number of days) taken for each of these steps varies from person to person, but is generally on the level of several days or several weeks. Accordingly, it is desirable that these steps be efficiently managed in terms of time and treatment be performed as early as possible for cancer patients, particularly for severe cancer patients.

It is preferable that, in addition to treatment being performed early for cancer patients, specific early treatment schedules be specified for cancer patients (and their families). In this regard, the same applies to medical institutions, cell manufacturers, cell manufacturers and distributors, and the like that provide treatment to a large number of cancer patients.

Accordingly, various embodiments provide an information management apparatus and a non-transitory computer-readable recording medium that enable efficient management of personalized medicine.

Solution to Problem

The present disclosure provides the following aspects.

An information management apparatus according to one aspect of the present disclosure includes at least one processor configured to: acquire first time information and second time information, the first time information being related to a time taken to acquire a predetermined amount of at least one or more specific nucleic acids based on a first cell acquired from a cancer patient, the second time information being related to a time taken to culture a second cell different from the first cell until a predetermined amount is reached; and store individual patient information in which the first time information and the second time information are associated with attribute information of the cancer patient.

Further, in the information management apparatus according to one aspect, the first time information includes at least one of first detailed time information and/or second detailed time information, the first detailed time information being related to a time taken to culture the first cell until a predetermined amount is reached, the second detailed time information being related to a time taken to synthesize the at least one or more specific nucleic acids contained in the first cell until a predetermined amount is reached.

Further, in the information management apparatus according to one aspect, the attribute information includes at least one selected from the group consisting of age information, cancer type information, information on an amount of the first cell acquired, immune information of the cancer patient, and cancer progression information.

Further, in the information management apparatus according to one aspect, the first cell is an immunocompetent cell contained in a cancer tissue.

Further, in the information management apparatus according to one aspect, the first cell is at least one or more selected from the group consisting of a T cell, a B cell, a dendritic cell, and a macrophage.

Further, in the information management apparatus according to one aspect, the second cell is a cell acquired from the cancer patient.

Further, in the information management apparatus according to one aspect, the second cell is at least one or more selected from the group consisting of a T cell, a B cell, a dendritic cell, and a macrophage.

Further, in the information management apparatus according to one aspect, the at least one processor is configured to calculate at least one of first correlation information and/or second correlation information based on a plurality of pieces of the stored individual patient information, the first correlation information being related to a correlation between the first time information and the attribute information, the second correlation information being related to a correlation between the second time information and the attribute information.

Further, in the information management apparatus according to one aspect, the first correlation information includes at least one of first detailed correlation information and/or second detailed correlation information, the first detailed correlation information being related to a correlation between the attribute information and first detailed time information related to a time taken to culture the first cell until a predetermined amount is reached, the second detailed correlation information being related to a correlation between the attribute information and second detailed time information related to a time taken to synthesize the at least one or more specific nucleic acids contained in the first cell until a predetermined amount is reached.

Further, in the information management apparatus according to one aspect, the at least one processor is configured to output a first prediction value related to the first time information of a new cancer patient, based on the attribute information of the new cancer patient and the first correlation information.

Further, in the information management apparatus according to one aspect, the first prediction value includes at least one of a first detailed prediction value and/or a second detailed prediction value, the first detailed prediction value being calculated based on the attribute information of the new cancer patient and first detailed correlation information, the first detailed correlation information being related to a correlation between the attribute information and first detailed time information related to a time taken to culture the first cell until a predetermined amount is reached, the first detailed prediction value being related to the first detailed time information of the new cancer patient, the second detailed prediction value being calculated based on the attribute information of the new cancer patient and second detailed correlation information, the second detailed correlation information being related to a correlation between the attribute information and second detailed time information related to a time taken to synthesize the at least one or more specific nucleic acids contained in the first cell until a predetermined amount is reached, the second detailed prediction value being related to the second detailed time information of the new cancer patient.

Further, in the information management apparatus according to one aspect, the at least one processor is configured to output a second prediction value related to the second time information of a new cancer patient, based on the attribute information of the new cancer patient and the second correlation information.

Further, in the information management apparatus according to one aspect, the at least one processor is configured to output at least a portion of a treatment schedule of the new cancer patient, based on at least one of the first prediction value and/or the second prediction value.

Further, in the information management apparatus according to one aspect, the at least one processor is configured to transmit at least one of the first prediction value or the second prediction value, via a communication line, to at least one of a terminal device of the new cancer patient and/or a terminal device in a medical institution that treats the new cancer patient.

Further, in the information management apparatus according to one aspect, the at least one processor is configured to transmit the at least a portion of the treatment schedule, via a communication line, to at least one of a terminal device of the new cancer patient and/or a terminal device in a medical institution that treats the new cancer patient.

Further, in the information management apparatus according to one aspect, the at least one processor may be configured to anonymize and store at least one piece of the attribute information.

Further, in the information management apparatus according to one aspect, the at least one processor may be configured to de-anonymize the anonymized at least one piece of the attribute information to allow the cancer patient and the new cancer patient to refer to the de-anonymized at least one piece of the attribute information thereof.

The attribute information of the cancer patient is stored in a memory as anonymized information such that a group and a plurality of groups constituted by the attribute information of the cancer patient are anonymized not to identify the cancer patient in comparison and analysis of the attribute information of the cancer patient and the group. The attribute information of the cancer patient may be labeled with agreement information about an agreement among the cancer patient, a doctor, and a family of the cancer patient. Such attribute information is made visible to the doctor, the cancer patient, or the family by the processor to check whether a match exists between agreement information obtained from an information decoder and the agreement information in the memory, whereas the attribute information of other cancer patients is not viewable. Therefore, anonymization is guaranteed.

A non-transitory computer-readable recording medium according to one aspect of the present disclosure has recorded thereon a computer program for causing at least one processor, when executed, to perform operations including acquiring first time information and second time information, the first time information being related to a time taken to acquire a predetermined amount of at least one or more specific nucleic acids based on a first cell acquired from a cancer patient, the second time information being related to a time taken to culture a second cell different from the first cell until a predetermined amount is reached; and storing individual patient information in which the first time information and the second time information are associated with attribute information of the cancer patient.

Advantageous Effects of Invention

Some embodiments of the present disclosure can provide an information management apparatus and a non-transitory computer-readable recording medium that enable efficient management of personalized medicine.

BRIEF DESCRIPTION OF DRAWINGS

FIG. 5 is a schematic diagram illustrating an example of individual patient information for each cancer patient stored by the information management apparatus illustrated in FIG. 1.

DESCRIPTION OF EMBODIMENTS

Figure 1:
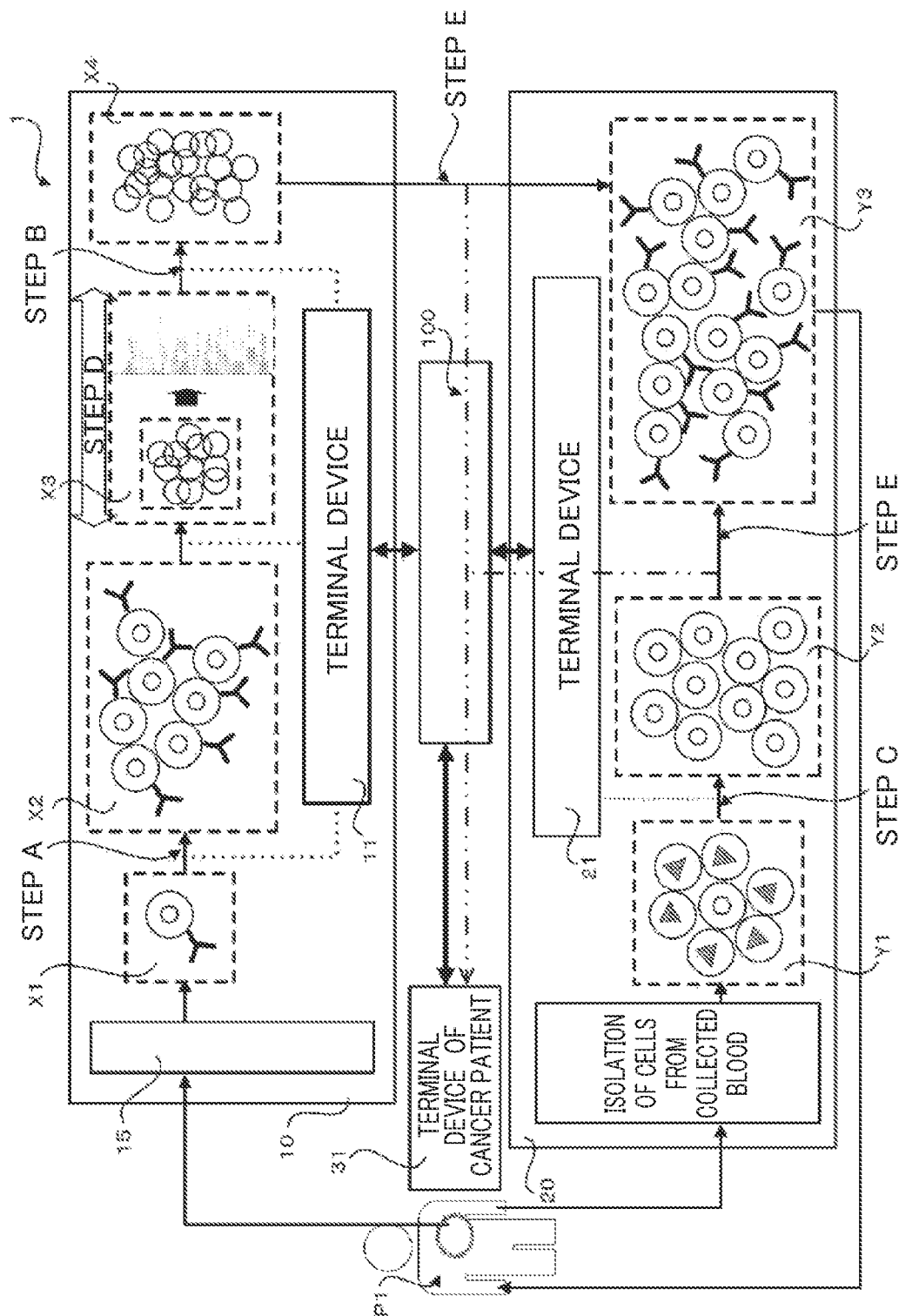
FIG. 1 is a block diagram illustrating an example configuration of an information management system including an information management apparatus according to an embodiment.

In the present disclosure, a numerical range of "A to B" indicates a range including "A" and "B" as a minimum value and a maximum value, respectively. In the present disclosure, when a plurality of components corresponding to each component are present in a substance, the content of each component in various substances means the total amount of the plurality of components present in the substances, unless otherwise specified. In the present disclosure, the term "step" includes not only an independent step but also a step that cannot be clearly distinguished from other steps as long as a desired action of the step is achieved.

Various embodiments will be described hereinafter with reference to the accompanying drawings. Elements common to the drawings bear the same reference numerals. It should be noted that elements illustrated in a certain figure may be omitted in other figures of the drawings for convenience of description. It should be understood that the accompanying drawings are not necessarily drawn to scale. In the present disclosure, the term "application" may be referred to as software or a program, and may be instructions for a computer, which are combined to obtain a certain result.

Figure 2:
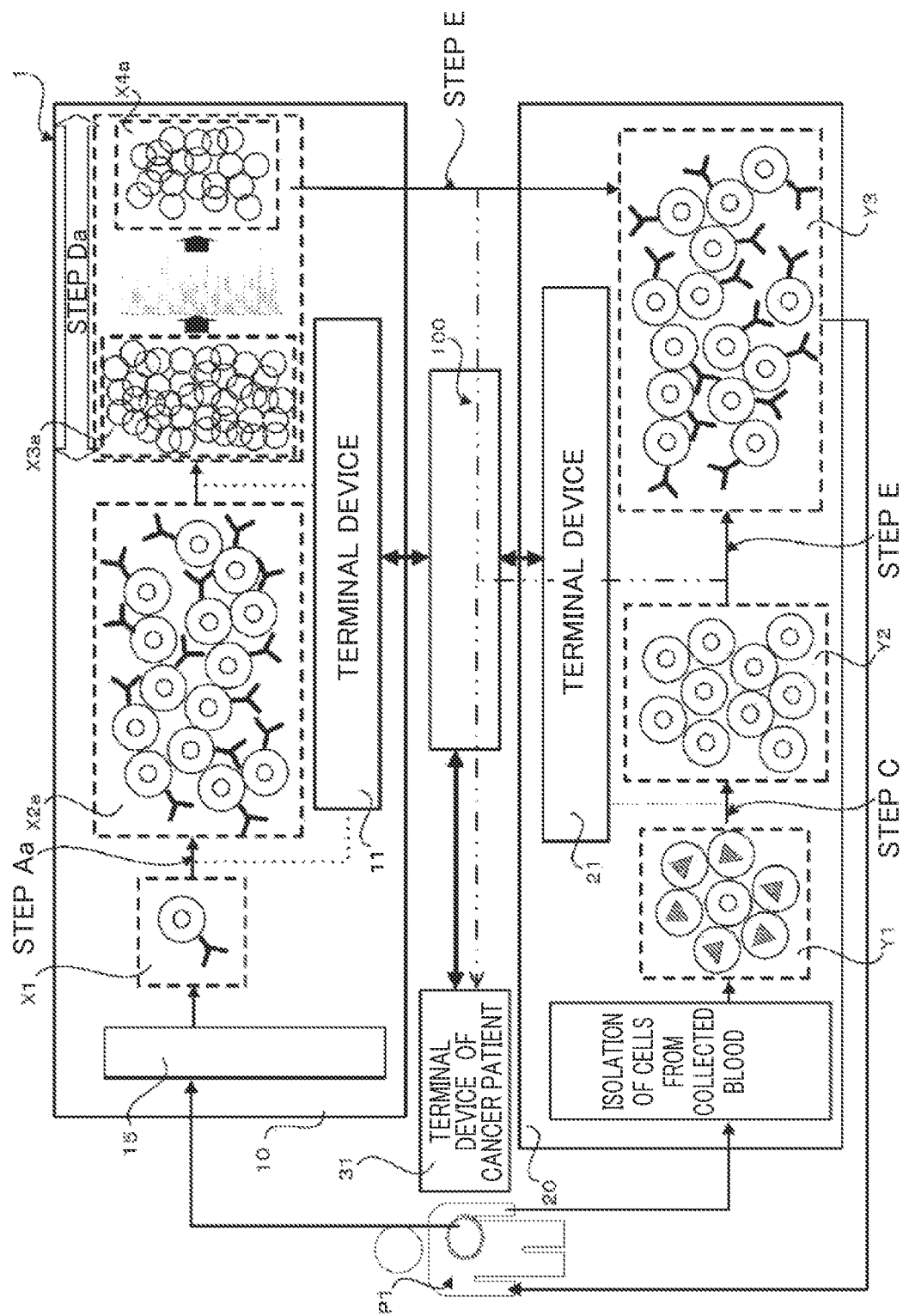
FIG. 2 is a block diagram illustrating an example configuration of the information management system including the information management apparatus according to the embodiment.
Figure 3:
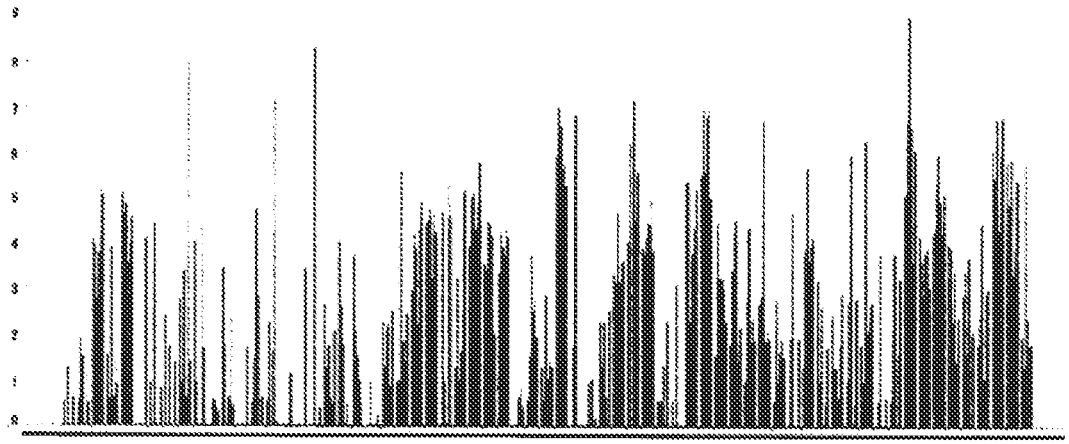
FIG. 3 is a diagram illustrating an example of an analysis result obtained in an analysis step in the information management system illustrated in FIG. 1.
Figure 4:
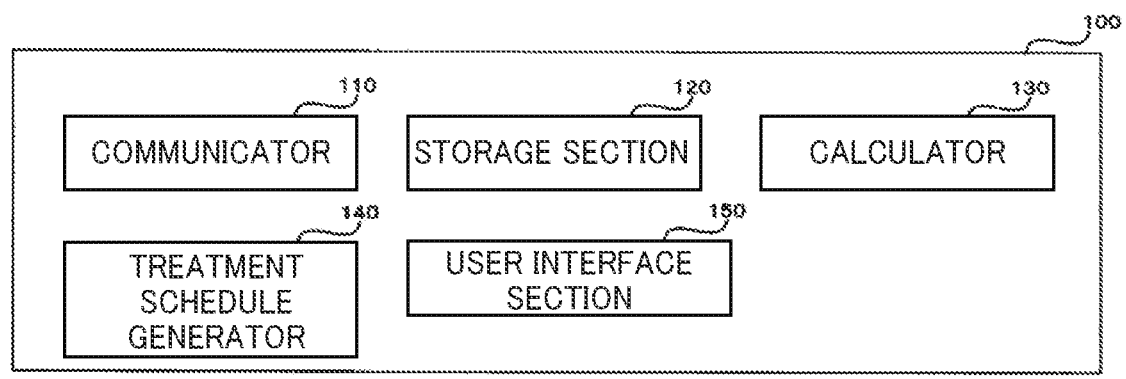
FIG. 4 is a block diagram schematically illustrating example functions of the information management apparatus illustrated in FIG. 1.

1. Configuration of Information Management Apparatus and Information Management System Including Information Management Apparatus Details of an information management apparatus according to an embodiment of the present disclosure and an information management system including the information management apparatus will be described with reference to FIGS. 1 to 5. FIGS. 1 and 2 are block diagrams illustrating example configurations of information management system 1 including information management apparatus 100 according to an embodiment. FIG. 3 is a diagram illustrating an example of an analysis result obtained in an analysis step in information management system 1 illustrated in FIG. 1. FIG. 4 is a block diagram schematically illustrating example functions of information management apparatus 100 illustrated in FIG. 1. FIG. 5 is a schematic diagram illustrating an example of individual patient information for each cancer patient stored by information management apparatus 100 illustrated in FIG. 1.

Information management system 1 and information management apparatus 100 can be applied to a TCR-T cell therapy, which is an example of therapy using base-sequence-modified immune cells, but are not limited thereto, and can be applied to other personalized medicine such as chimeric antigen receptor (CAR) T cell therapy. Information management system 1 and information management apparatus 100 illustrated in FIG. 1 can be applied without limitation in a therapy including two or more processes (steps) of culturing cells.

Information management system 1 and information management apparatus 100 according to an embodiment of the present disclosure will be described hereinafter for convenience in association with a TCR-T cell therapy as an example of personalized medicine. It should be noted that the TCR-T cell therapy including a series of steps illustrated in FIG. 1 and other figures of the drawings is merely an example. That is, it should be noted that information management system 1 and information management apparatus 100 according to an embodiment of the present disclosure can also be applied to personalized medicine in which a first cell described below is a cell other than that of a cancer tissue of cancer patient P1, personalized medicine in which a second cell described below is a cell of a person other than cancer patient P1, and the like.

1-1. Work, Treatment, and the Like to be Executed in First Medical Institution 10 as One Example (Information to be Stored in Terminal Device 11)

In the TCR-T cell therapy, first, T cells (first cell) contained in part of a cancer tissue (the whole of the cancer tissue in the total extirpation of cancer) are acquired from cancer patient P1 in, for example, first medical institution 10. Subsequently, the cancer tissue is subjected to, for example, a fluorescence-activated cell sorting method using a fluorescence-activated cell sorter (FACS (registered trademark)), whereby T cells are selected from various cell types contained in the cancer tissue. Antigen receptor molecules, TCRs, capable of recognizing cancer antigens are expressed on the cell membrane of the selected T cells. However, not all of the TCRs acquired from cancer patient P1 can recognize cancer antigens. For this reason, it is necessary to separately perform analysis work for clarifying, for each cancer patient, which TCR can recognize a cancer antigen (is effective for cancer treatment).

Such analysis work involves preparing a necessary and sufficient amount of T cells (i.e., polynucleotides encoding TCRs). Accordingly, in the TCR-T cell therapy, as illustrated in FIG. 1, T cells acquired from cancer patient P1 and sorted by the FACS are cultured until the amount of the T cells is increased to an amount necessary and sufficient to subject the T cells to the analysis work. If a necessary and sufficient amount of T cells have already been prepared (in advance), the culture is not necessary. In FIG. 1, FACS 15 selects T cells from a cancer tissue acquired from cancer patient P1, and a specific amount of T cells selected (state "X1") is cultured to acquire (proliferate) more T cells, that is, state "X2" is presented. A culture step of increasing the amount of T cells from state "X1" to state "X2" is represented as "step A". After the amount of T cells is increased to a predetermined amount by culture, for example, mRNA is extracted from the T cells, and sequence information of the obtained mRNA is analyzed by a base-sequence analyzer to extract sequence information related to TCRs. FIG. 3 illustrates an example of an analysis result indicating what kind of TCR and in what amount the TCR is contained in the T cells in the state X2 by subjecting the T cells to the fluorescence-activated cell sorting method with an FACS (registered trademark). A polynucleotide encoding the target TCR may be extracted based only on the information on the polynucleotide sequence by using sequence information analysis, may be extracted based on the acquired polynucleotide, or may be extracted based on both the sequence information and the acquired polynucleotide. The polynucleotide encoding the TCR is not limited to mRNA, and may be DNA.

Subsequently, among the polynucleotides encoding TCRs identified by the analysis work performed with the base-sequence analyzer described above (such polynucleotides are hereinafter referred to as "TCR polynucleotides"), TCR polynucleotides effective for cancer treatment for cancer patient P1 (TCR polynucleotides capable of recognizing cancer antigens in the cancer tissue of cancer patient P1) can be identified as those having a high TCR expression level, for example. Not one kind of TCR polynucleotide but a plurality of kinds of TCR polynucleotides may be identified through the above identifying work. The TCR polynucleotide that can be identified may or may not have the highest expression level. In a series of work states up to the analysis work described above and the work of identifying TCR polynucleotides effective for cancer treatment for cancer patient P1, a state in which mRNA is extracted from the cultured T cells is represented as "X3" in FIG. 1. In FIG. 1, the step related to the analysis work and the work step for identifying TCR polynucleotides or TCR base sequences encoding the TCR polynucleotides are collectively referred to as "step D".

In step A, the term "predetermined amount" in the expression "the T cells are cultured until a predetermined amount is reached" is not particularly limited as long as the analysis work described above for the TCR base sequences can be performed by the base-sequence analyzer, and may be appropriately changed depending on the analyzer or the like used for the analysis work.

Subsequently, when TCR polynucleotides effective for cancer treatment for cancer patient P1 are identified, the amount of the identified TCR polynucleotides is increased until a predetermined amount is reached. In this case, the "predetermined amount" is appropriately set in consideration of an amount sufficient to generate T cells with modified base sequences described below (amount sufficient to generate T cells with modified base sequences required for administration to cancer patient P1).

Examples of the method for increasing the amount of the identified TCR polynucleotides to a predetermined amount include a method for, in FIG. 1, separately synthesizing the identified TCR polynucleotides in first medical institution 10 or another location. In FIG. 1, the amount of the TCR polynucleotides identified in state "X3" described above is increased until a predetermined amount is reached, that is, state "X4" is presented. A step of increasing the amount of only a specific TCR polynucleotide to that in state "X4" is represented as "step B".

In the TCR-T cell therapy, a series of operations including "step A", "step B", and "step D" and managing the states "X1" to "X4" for the T cells and the TCR polynucleotides can be executed in first medical institution 10 in FIG. 1, as an example, but not as a limitation. In other words, at least one of "step A", "step B", and "step D" may be executed in a location other than first medical institution 10, and, for example, the work of identifying TCR base sequences or TCR polynucleotides relating to state "X3" may be executed in a location other than first medical institution 10.

In information management system 1 according to the embodiment illustrated in FIG. 1, it is assumed that terminal device 11 is installed in first medical institution 10. Terminal device 11 can receive and store attribute information of cancer patient P1, information related to "step A", "step B", and "step D" described above, which are executed in first medical institution 10, and other information. Terminal device 11 has a hardware configuration that is basically similar to that of information management apparatus 100 described below.

The attribute information of cancer patient P1 can include, without limitation, at least one of various types of information such as the name, age, cancer type, amount of acquired T cells (the amount of acquired T cells in state "X" described above), immune information, and cancer progression (cancer stage) of cancer patient P1. The immune information can be determined based on the number of lymphocytes, for example. In this case, for example, when the number of lymphocytes is equal to or less than a predetermined number, it can be determined that the immune status is poor. The information related to "step A", "step B", and "step D", which can be input to terminal device 11, includes information (first time information) related to the total time (total number of days) taken for these steps. The first time information can include information (first detailed time information) related to the time taken for "step A" and information (second detailed time information) related to the time taken for "step B". Information (third detailed time information) related to the time taken for "step D" is basically not information that changes depending on the cancer patient, and thus may not necessarily be input to (stored in) terminal device 11 (the third detailed time information may not necessarily be included in the first time information).

Terminal device 11 need not be physically installed in first medical institution 10, and may be a cloud server (server device) in an environment that enables electromagnetic communication via a communication line. Terminal device 11 is also connectable to information management apparatus 100, which will be described in detail below, via a communication line.

In "step A", an appropriate existing method can be used for culture conditions, a culture device, a specific culture process, and the like for culturing T cells. In "step B", an appropriate existing method can be used for a specific synthesis method, a synthesizer, a specific synthesis process, and the like for synthesizing the TCR polynucleotides.

The work, the treatment, and the like executed in first medical institution 10 as an example, which are illustrated in FIG. 1, may be assumed to be those illustrated in FIG. 2. In short, in the work, the treatment, and the like illustrated in FIG. 2, which are executed in first medical institution 10 as an example, "step B" illustrated in FIG. 1 is omitted.

Specifically, in the work, the treatment, and the like illustrated in FIG. 2, T cells acquired from cancer patient P1 and selected by FACS 15 are cultured and increased in amount in advance to such an extent that TCR polynucleotides in an amount sufficient not only to subject the T cells to the analysis work described above but also to generate T cells with modified base sequences (TCR-T cells) can be directly acquired. In FIG. 2, a specific amount of T cells in state "X1", which are acquired from cancer patient P1 and selected by FACS 15, is cultured to generate (proliferate) a much larger amount of T cells than the amount of T cells in state "X2" in FIG. 1, that is, state "X2a" is presented. A culture step of increasing the amount of T cells from state "X1" to state "X2a" is represented as "step Aa". The TCR polynucleotides are biosynthesized in the T cells simultaneously with the culture of the T cells. A large amount of T cells acquired by mass culture is subjected to the base-sequence analyzer described above. Thus, as in the case described with reference to FIG. 1, it is possible to analyze what kind of TCR and in which amount the TCR is contained in the obtained large amount of T cells.

Subsequently, among the TCR polynucleotides identified by the analysis work performed with the base-sequence analyzer described above, TCR base sequences effective for cancer treatment for cancer patient P1 (TCR base sequences capable of recognizing cancer antigens in the cancer tissue of cancer patient P1) are identified, for example, in the order of TCR expression level, as described above. When TCR base sequences effective for cancer treatment for cancer patient P1 are identified, only the TCR polynucleotides of the identified TCR base sequences are taken out (extracted). In FIG. 2, as described above, a large amount of T cells is cultured in step Aa, and TCR polynucleotides are also biosynthesized in the large amount of T cells. In FIG. 2, accordingly, as described above, a considerable amount of identified TCR polynucleotides is taken out. Thus, unlike FIG. 1, it is not necessary to separately synthesize the identified TCR polynucleotides until a predetermined amount is reached, and "step B" in FIG. 1 is not necessary. In FIG. 2, the step related to the analysis work described above, the work step for identifying TCR base sequences, and the step of taking out the identified TCR polynucleotides are collectively referred to as "step Da".

In FIG. 2, terminal device 11 can receive and store attribute information of cancer patient P1, information related to "step Aa" and "step Da" described above, which are executed in first medical institution 10, and other information. The information related to "step Da" means information (fourth detailed time information) related to the time taken for "step Da". The fourth detailed time information is basically not information that changes depending on the cancer patient, and thus may not necessarily be input to (stored in) terminal device 11 (the fourth detailed time information may not necessarily be included in the first time information). In FIG. 2, furthermore, terminal device 11 does not receive (store) the second detailed time information described above. In some cases, terminal device 11 stores only the first detailed time information.

1-2. Work, Treatment, and the Like to be Executed in Second Medical Institution as One Example (Information to be Stored in Terminal Device 21)

In the TCR-T cell therapy, as an example, in parallel with the work, the treatment, and the like executed in first medical institution 10, a step of acquiring a large amount of a target T cell into which the nucleic acids described above, that is, the identified TCR polynucleotides, is to be injected is executed in second medical institution 20 as an example to generate T cells with modified base sequences, which is required for administration to cancer patient P1.

First, as an example, in second medical institution 20, blood is collected from cancer patient P1 to acquire a certain amount of cells (second cell) including T cells, which are target cells. In addition, the acquired second cell is cultured until a predetermined amount is reached. In this case, the "predetermined amount" is appropriately set in consideration of an amount sufficient to generate T cells with modified base sequences, that is, an amount sufficient to generate T cells with modified base sequences required for administration to cancer patient P1. In FIG. 1, the blood of cancer patient P1 is acquired, and a small amount of the second cell can be acquired from the acquired blood. Then, the acquired small amount of the second cell (in FIG. 1, the second cell in state "Y1") can be cultured to acquire a necessary and sufficient amount of the second cell.

Examples of the second cell include an immunocompetent cell. The origin of the immunocompetent cell is not particularly limited, and the immunocompetent cell may be obtained from any tissue such as blood, bone marrow, or spleen, and may be derived from a stem cell or a pluripotent stem cell. Examples of the immunocompetent cell include a T cell, a B cell, an NK cell, a dendritic cell, and a macrophage. Examples of the cell that can be used to induce the immunocompetent cell include a hematopoietic stem cell, a mesenchymal stem cell, an embryonic stem cell, and an induced pluripotent stem cell (iPS cell). The second cell may be, for example, a T cell obtained by sorting from peripheral blood mononuclear cells (PBMCs).

The series of steps for acquiring a necessary and sufficient amount of T cells serving as the second cell from PBMCs of cancer patient P1 may be performed by using, for example, a method (referred to as a "first method", for convenience) of selectively proliferating only T cells contained in the PBMCs. The method of selectively proliferating only T cells in the PBMCs may be performed by using any known technique, and examples of such a method include a method of culturing in a medium containing a cytokine such as IL-2. Alternatively, a method (referred to as a "second method", for convenience) of selecting only T cells in advance from a small amount of PBMCs serving as the second cell by using the FACS described above and culturing only the selected T cells to acquire (generate) a necessary and sufficient amount of T cells may be used.

FIGS. 1 and 2 illustrate a culture step ("step C" in FIGS. 1 and 2) of selectively proliferating only T cells (state "Y2" in FIGS. 1 and 2) from a small amount of T cells (state "Y1" in FIGS. 1 and 2) serving as the second cell from blood-derived PBMCs containing a mixture of various cells by using the first method described above as an example.

A large amount of TCR polynucleotides acquired as described above are introduced into the large amount of T cells acquired in the culture step "step C" to generate T cells with modified base sequences (TCR-T cells). In FIGS. 1 and 2, a step of introducing a large amount of nucleic acids (identified TCR polynucleotides) obtained as described above into a necessary and sufficient amount of T cells obtained in "step C" is represented as "step E". In FIGS. 1 and 2, "step E" is executed in second medical institution 20, as an example, but not as a limitation. "Step E" may be executed in first medical institution 10, or may be executed in a location other than first medical institution 10 and second medical institution 20.

In information management system 1 according to the embodiment illustrated in FIG. 1, it is assumed that terminal device 21 is installed in second medical institution 20. Terminal device 21 can receive and store attribute information of cancer patient P1, information related to "step C" described above, which is executed in second medical institution 20, and other information. The attribute information of cancer patient P1 may include, without limitation, at least one of various types of information such as the name, age, amount of collected blood, initial amount of acquired PBMCs, cancer type, and cancer progression (cancer stage) of cancer patient P1, as described above. The information related to "step C", which can be input to terminal device 21, means information (second time information) related to the time taken for "step C". The second time information may include information related to the time taken for "step E".

Like terminal device 11, terminal device 21 need not be physically installed in second medical institution 20, and may be a cloud server (server device) in an environment that enables electromagnetic communication via a communication line. Terminal device 21 is also connectable to information management apparatus 100, which will be described in detail below, via a communication line. Terminal device 21 has a hardware configuration that is basically similar to that of information management apparatus 100 described below.

In "step C", an appropriate existing method can be used for culture conditions, a culture device, a specific culture process, and the like for culturing the second cell. In "step E", an appropriate existing method can be used for a specific method, a device, a specific process, and the like for introducing nucleic acids (identified TCR polynucleotides) into T cells.

As described above, in the work, the treatment, and the like described with reference to FIGS. 1 and 2, which are executed in first medical institution 10 as an example, a T cell is used as the first cell, as an example, but not as a limitation. The first cell is desirably an immunocompetent cell, for example, and may be at least one selected from the group consisting of a T cell, a B cell, a dendritic cell, and a macrophage. In addition, the nucleic acids (identified TCR polynucleotides) to be increased in amount until a predetermined amount is reached have been described as the nucleic acids of the T-cell antigen receptors as described above, as an example, but not as a limitation. The specific nucleic acids may be any molecule that can be expected to have a cytotoxic effect on cancer cells, and can be appropriately selected depending on the type of the first cell.

1-3. Information Management Apparatus 100

As an example, information management apparatus 100 according to an embodiment of the present disclosure is a terminal device or a server device connected to terminal device 11 and terminal device 21 via a communication line. Information management apparatus 100 may be a single terminal device or server device, or may be constituted by a plurality of terminal devices or server devices for the purpose of load distribution. When information management apparatus 100 is a server device, the server device may be a cloud server residing in the cloud. Alternatively, information management apparatus 100 may be integrated with any one of terminal device 11 and terminal device 21. Information management apparatus 100 serving as a terminal device or a server device mainly includes, as hardware, a central processing unit, a main storage device, an input/output interface, an input device, an auxiliary storage device, an output device (all not illustrated), and the like, which are connected to each other through a data bus and/or a control bus, and can execute various kinds of information processing described below.

The central processing unit is referred to as a "CPU", and is capable of calculating an instruction and data stored in the main storage device and storing a calculation result in the main storage device. The central processing unit is also capable of controlling the input device, the auxiliary storage device, the output device, and the like via the input/output interface. Information management apparatus 100 can include one or more central processing units. Information management apparatus 100 may include, instead of or in addition to the central processing unit, at least either one or more microprocessors or a graphics processing unit (GPU).

The main storage device is referred to as a "memory", and is capable of storing instructions and data received via the input device, the auxiliary storage device, and the input/output interface, calculation results of the central processing unit, and the like. The main memory can include, but not be limited to, a random access memory (RAM), a read only memory (ROM), a flash memory, and/or the like.

The auxiliary storage device is a storage device having a larger capacity than the main storage device. The auxiliary storage device is capable of storing instructions and data (computer programs) constituting a specific application. Specific examples of the specific application include an information management application for therapy using base-sequence-modified immune cells, and a web browser application. Further, the auxiliary storage device is capable of transmitting these instructions and data (computer programs) to the main storage device via the input/output interface under the control of the central processing unit. The auxiliary storage device can include, but not be limited to, a magnetic disk device and/or an optical disk device.

The input device is a device that captures data from the outside, and can include, but not be limited to, a touch panel, a button, a keyboard, a mouse, and/or a sensor.

The output device can include, but not be limited to, a display device, a touch panel, and/or a printer device.

In such a hardware configuration, the central processing unit can sequentially load instructions and data (computer programs) constituting the specific application stored in the auxiliary storage device into the main storage device, and can calculate the loaded instructions and data. As a result, the central processing unit can transmit and receive various kinds of information to and from terminal device 11, terminal device 21, terminal device 31 of cancer patient P1 (see FIGS. 1 and 2), and the like via the input/output interface and the communication line or by controlling the output device via the input/output interface.

Information management apparatus 100 is installed with a specific application (e.g., the information management application for therapy using base-sequence-modified immune cells described above) for acquiring various kinds of information related to therapy using base-sequence-modified immune cells. As a result, information management apparatus 100 can execute the application to execute, for example, acquisition of various kinds of information related to the TCR-T cell therapy.

As illustrated in FIG. 4, information management apparatus 100 having the hardware configuration described above can mainly include communicator 110, storage section 120, calculator 130, treatment schedule generator 140, and user interface section 150.

Communicator 110 is capable of receiving the attribute information of cancer patient P1 and the first time information from terminal device 11 and the attribute information of cancer patient P1 and the second time information from terminal device 21 via the communication line. As described above, the first time information includes at least one of the first detailed time information and the second detailed time information. Communicator 110 is capable of transmitting these pieces of information received from terminal device 11 and terminal device 21 to storage section 120. In the present disclosure, the "communication line" can include, but not be limited to, a wired network, a mobile phone network, a wireless network (such as WiFi, WiMax, or cellular network), a fixed telephone network, the Internet, a local area network (LAN), a wide area network (WAN), an intranet, and/or Ethernet (registered trademark).

Communicator 110 is also capable of receiving, from terminal device 31 of cancer patient P1, the attribute information of cancer patient P1 and various kinds of instruction information related to the intention and request of cancer patient P1 and change instructions and the like from cancer patient P1. That is, terminal device 31 of cancer patient P1 is installed with a specific application (e.g., the information management application for therapy using genetically modified immune cells described above) to enable transmission and reception of various kinds of information between information management apparatus 100 and terminal device 31 of cancer patient P1. Examples of the instruction information described above to be transmitted from cancer patient P1 to (communicator 110 of) information management apparatus 100 can include, without limitation, information related to a change in the attribute information of cancer patient P1 (e.g., a change in age), information related to approval or disapproval of a treatment schedule transmitted from information management apparatus 100 to terminal device 31 of cancer patient P1, and information related to a desire to change the treatment schedule.

Storage section 120 is capable of storing information received from communicator 110. As illustrated in FIG. 5, storage section 120 is capable of storing individual patient information of each patient (in FIG. 5, individual patient information Q1 of cancer patient P1, individual patient information Q2 of patient P2, individual patient information Q3 of patient P3, etc. are illustrated) in which the attribute information of cancer patient P1, which is received from communicator 110, is associated with the first time information and the second time information described above. Storage section 120 is capable of storing individual patient information of each cancer patient in which various kinds of other information on the cancer patient, date information related to a treatment date or the like, and other information are associated with the attribute information of the cancer patient.

Storage section 120 may store the attribute information of each cancer patient such that at least part of the attribute information is anonymized and stored. That is, of the pieces of attribute information, for example, at least one of the name, age, cancer type, amount of acquired T cells (amount of acquired T cells in state "X1" described above), cancer progression (cancer stage), and the like of each cancer patient can be anonymized and stored. A known technique for data anonymization can be used as the anonymization method.

Calculator 130 uses a large number of pieces of individual patient information (represented as Q1, Q2, Q3, etc. in FIG. 5) of a large number of cancer patients (in FIG. 5, cancer patients P1, P2, P3, P4, P5, P6, P7, P8, etc.), which are stored in storage section 120, to calculate information (first correlation information) related to the correlations between the first time information and the pieces of attribute information (information related to the ages, cancer types, amounts of acquired T cells, cancer stages, and the like) described above. Calculator 130 also uses the large number of pieces of individual patient information related to the large number of cancer patients, which are stored in storage section 120, to calculate information (second correlation information) related to the correlations between the second time information and the pieces of attribute information (information related to the ages, cancer types, amounts of collected blood, cancer stages, and the like) described above.

The first correlation information may include at least one of information (first detailed correlation information) related to the correlations between the first detailed time information and the attribute information described above and information (second detailed correlation information) related to the correlations between the second detailed time information and the attribute information described above.

As an example, calculator 130 is capable of generating a multiple regression expression with reference to a large number of pieces of individual patient information stored in storage section 120 and calculating the first correlation information (the first detailed correlation information and the second detailed correlation information) and the second correlation information described above.

Specifically, calculator 130 generates (calculates), as the first detailed correlation information, a multiple regression expression in which attribute information (e.g., information related to the age, cancer type, amount of acquired T cells, and cancer stage) of a given cancer patient is set as explanatory variables and the first detailed time information corresponding to the given cancer patient is set as an objective variable. For example, the multiple regression expression corresponding to the first detailed correlation information is given by Expression 1 below.

$$\text{First detailed time information}=A+(B\times\text{age})+(C\times\text{cancer type})+(D\times\text{amount of acquired }T\text{ cells})+(E\times\text{stage}) \quad \text{(Expression 1)}$$

In Expression 1, A is the intercept in the multiple regression expression, and B to E are the respective coefficients of the explanatory variables. In the multiple regression expression in Expression 1, the four attributes, namely, age, cancer type, amount of acquired T cells, and stage, are set as explanatory variables, as an example, but not as a limitation. One of the four attributes may be set as explanatory variables, or any two or three of the four attributes may be set as explanatory variables. Alternatively, attribute information other than the four attributes described above, for example, immune information of the cancer patient, may be added as an explanatory variable.

Further, like the first detailed correlation information, calculator 130 generates (calculates), as the second detailed correlation information, a multiple regression expression in which attribute information (e.g., information related to the age, cancer type, amount of acquired T cells, and cancer stage) of a given cancer patient is set as explanatory variables and the second detailed time information corresponding to the given cancer patient is set as an objective variable. For example, the multiple regression expression corresponding to the second detailed correlation information is given by Expression 2 below. In Expression 2, F is the intercept in the multiple regression expression, and G to J are the respective coefficients of the explanatory variables. Also in the multiple regression expression in Expression 2, one of the four attributes in Expression 2 below may be set as an explanatory variable, or any two or three of them may be set as explanatory variables. Alternatively, attribute information other than the four attributes below, for example, immune information of the cancer patient, may further be added as an explanatory variable.

$$\text{Second detailed time information}=F+(G\times\text{age})+(H\times\text{cancer type})+(I\times\text{amount of acquired }T\text{ cells})+(J\times\text{stage}) \quad \text{(Expression 2)}$$

Calculator 130 further generates (calculates), as the second correlation information, a multiple regression expression in which attribute information (e.g., the age and amount of collected blood) of a given cancer patient is set as explanatory variables and the second time information corresponding to the given cancer patient is set as an objective variable. For example, the multiple regression expression corresponding to the second correlation information is given by Expression 3 below. In Expression 3, K is the intercept in the multiple regression expression, and L and M are the respective coefficients of the explanatory variables. Also in the multiple regression expression in Expression 3, one of the two attributes in Expression 3 below may be set as an explanatory variable, or attribute information other than the two attributes below may further be added as an explanatory variable.

$$\text{Second time information}=K+(L\times\text{age})+(M\times\text{amount of collected blood}) \quad \text{(Expression 3)}$$

Calculator 130 may generate (calculate) the first correlation information (the first detailed correlation information and the second detailed correlation information) and the second correlation information by, in place of (or in addition to) the multiple regression expressions described above, training a neural network with machine learning. Specifically, a first dataset including an aggregate of various pieces of attribute information corresponding to a given cancer patient (e.g., patient P3) and a second dataset including the first detailed time information corresponding to the given cancer patient (patient P3) are generated. Such first datasets and second datasets are prepared for a large number of cancer patients, and first training data including the first datasets as input values and the second datasets as output values is generated. The neural network is trained with machine learning by using the first training data to generate a machine-learning-trained neural network corresponding to the first detailed correlation information.

Likewise, a third dataset including an aggregate of various pieces of attribute information corresponding to a given cancer patient and a fourth dataset including the second detailed time information corresponding to the given cancer patient are generated. Such third datasets and fourth datasets are prepared for a large number of cancer patients, and second training data including the third datasets as input values and the fourth datasets as output values is generated. The neural network is trained with machine learning by using the second training data to generate a machine-learning-trained neural network corresponding to the second detailed correlation information.

Further, a fifth dataset including an aggregate of various pieces of attribute information corresponding to a given cancer patient and a sixth dataset including the second time information corresponding to the given cancer patient are generated. Such fifth datasets and sixth datasets are prepared for a large number of cancer patients, and third training data including the fifth datasets as input values and the sixth datasets as output values is generated. The neural network is trained with machine learning by using the third training data to generate a machine-learning-trained neural network corresponding to the second correlation information.

Calculator 130 is also capable of outputting at least one of a prediction value (first prediction value) related to the first time information and a prediction value (second prediction value) related to the second time information in the TCR-T cell therapy as an example provided to a new cancer patient (patient to be treated with the TCR-T cell therapy as an example), based on the generated (calculated) multiple regression expressions (Expressions 1 to 3 described above) or the machine-learning-trained neural networks and attribute information of the new cancer patient. The first prediction value can include at least one of a first detailed prediction value based on the first detailed correlation information (e.g., Expression 1 described above) and a second detailed prediction value based on the second detailed correlation information (e.g., Expression 2 described above). The attribute information of the new cancer patient, for example, "77 years old", "stomach cancer", "10 <7> T cells acquired", "stage 3", and "400 mL of blood collected", is transmitted to information management apparatus 100 (communicator 110) via terminal device 11 and terminal device 21. Then, calculator 130 can substitute the attribute information of the new cancer patient into the explanatory variables in Expressions 1 to 3 given above to calculate the first detailed prediction value (e.g., "14 days"), the second detailed prediction value (e.g., "5 days"), and the second prediction value (e.g., "10 days").

Calculator 130 can transmit the calculated first prediction value (the first detailed prediction value and the second detailed prediction value) and second prediction value to communicator 110, and communicator 110 can transmit these prediction values to terminal device 11, terminal device 21, and terminal device 31 of the new cancer patient. As a result, first medical institution 10, second medical institution 20, and the new cancer patient can grasp an overview of the treatment schedule for the TCR-T cell therapy as an example for the new cancer patient.

Calculator 130 further transmits the calculated first prediction value (the first detailed prediction value and the second detailed prediction value) and second prediction value to treatment schedule generator 140.

Treatment schedule generator 140 can output, based on at least one of the first prediction value and the second prediction value received from calculator 130, at least a portion of the schedule of the treatment to be performed on the new cancer patient. Specifically, for example, it is assumed that T cells are acquired from a new cancer patient on "Dec. 9, 2020". In this case, on the same day, various kinds of attribute information of the new cancer patient are transmitted to information management apparatus 100 via terminal device 11. Calculator 130 calculates the first prediction value (assumed to be, for example, "14 days" in this case) and the second prediction value (assumed to be, for example, "7 days" in this case), and these prediction values are transmitted from calculator 130 to treatment schedule generator 140. Based on the first prediction value and the second prediction value received from calculator 130, namely, "14 days" and "7 days", respectively, treatment schedule generator 140 can output, for example, "Dec. 23, 2020", which is 14 days after "Dec. 9, 2020", as the date on which state "X4" in FIG. 1 is obtained, and output "Dec. 16, 2020" (i.e., 7 days before Dec. 23, 2020) as the date on which blood is collected from the new cancer patient to obtain PBMCs in state "Y2" on "Dec. 23, 2020". As a result, it is possible to output a treatment schedule in which the date on which state "X4" is obtained and the date on which state "Y2" is obtained in FIG. 1 are synchronized.

Treatment schedule generator 140 can transmit the output treatment schedule to communicator 110. Communicator 110 can transmit the treatment schedule to terminal device 11, terminal device 21, and terminal device 31 of the new cancer patient. As a result, first medical institution 10, second medical institution 20, and the new cancer patient can immediately grasp the details of the treatment schedule for the TCR-T cell therapy as an example for the new cancer patient. In addition, treatment can be efficiently and rapidly provided to the new cancer patient.

User interface section 150 can be operated by the user of information management apparatus 100 to change various settings, directly input various types of information to information management apparatus 100 without using a communication line, and execute other operations.

Information management apparatus 100 according to the embodiment described above can efficiently manage therapy using base-sequence-modified immune cells, such as the TCR-T cell therapy, as an example. In addition, treatment can be efficiently and rapidly provided to a new cancer patient.

In the embodiment described above, it is assumed that specific numerical values are stored or calculated for the first time information, the first detailed time information, the second detailed time information, the second time information, the first prediction value, the first detailed prediction value, the second detailed prediction value, and the second prediction value. It should be noted that some or all of these numerical values may be 0 or incalculable (infinite) and such certain exceptional cases are also accepted. In a first exceptional case, for example, when the immune status of a certain cancer patient is significantly poor and it is practically impossible to acquire a predetermined amount of a specific nucleic acid on the basis of the first cell acquired from the certain cancer patient, the first time information may be stored as 0 or an incalculable (infinite) value, or a predetermined numerical value, for example, 1 (day), may be automatically stored. Likewise, in a second exceptional case, for example, when the immune status of a certain cancer patient is significantly poor and it is practically impossible to culture the second cell acquired from the certain cancer patient until a predetermined amount is reached, the second time information may be stored as 0 or an incalculable (infinite) value, or a predetermined numerical value, for example, 1 (day), may be automatically stored.

In a third exceptional case, for example, when the immune status of a new cancer patient is significantly poor and at least one of the first prediction value and the second prediction value is output as 0 or an incalculable (infinite) value, the at least one of the first prediction value and the second prediction value output as 0 or an incalculable (infinite) value may be automatically rewritten to a predetermined numerical value, for example, 1 (day).

In the first exceptional case described above, personalized medicine can be adopted in which cells acquired from a person different from the certain cancer patient and satisfying a certain condition are substituted for the first cell and a predetermined amount of a specific nucleic acid is acquired based on the substituted cells. In the second exceptional case described above, personalized medicine can be adopted in which cells acquired from a person different from the certain cancer patient and satisfying a certain condition are substituted for the second cell and the substituted cells are cultured until a predetermined amount is reached. In the third exceptional case described above, personalized medicine can be adopted in which cells acquired from a person different from the new cancer patient and satisfying a certain condition are substituted for the first cell or the second cell (or both, as the case may be).

2. Variations

Information management system 1 including information management apparatus 100 according to the embodiment described above may also have other additional functions.

Specifically, for example, a device for synthesizing the TCR polynucleotides used in "step B" in FIG. 1 may be linked to terminal device 11 via a communication line to transmit a signal indicating the completion of "step B" to terminal device 11. Upon receipt of the data, terminal device 11 can transmit alert information indicating that the work of "step E" is to be executed soon to terminal device 31 of the new cancer patient. As a result, as an example, in a case where a new cancer patient is to be subjected to treatment for the TCR-T cell therapy, the new cancer patient can timely grasp that TCR-T administration is to be performed soon.

Further, in FIG. 1, the culture device used in "step C" may be linked to terminal device 21 via a communication line to transmit a signal indicating the completion of "step C" to terminal device 21. Upon receipt of the data, terminal device 21 can transmit alert information indicating that the work of "step E" is to be executed soon to terminal device 31 of the new cancer patient. As a result, as an example, in a case where a new cancer patient is to be subjected to treatment for the TCR-T cell therapy, the new cancer patient can timely grasp that TCR-T administration is to be performed soon.

Further, in FIG. 2, the culture device used in "step Aa" may be linked to terminal device 11 via a communication line to transmit a signal indicating the completion of "step Aa" to terminal device 11. Upon receipt of the data, terminal device 11 can transmit alert information indicating that the work of "step E" is to be executed soon to terminal device 31 of the new cancer patient. As a result, as an example, in a case where a new cancer patient is to be subjected to treatment for the TCR-T cell therapy, the new cancer patient can timely grasp that TCR-T administration is to be performed soon.

In information management system 1 including information management apparatus 100 according to the embodiment described above, it is basically assumed, but not required, that various kinds of information are transmitted from information management apparatus 100 to terminal device 31 of the cancer patient. Specifically, since the attribute information, the first time information, the second time information, the individual patient information, the various prediction values, and the like of each cancer patient described above are all stored in information management apparatus 100, each individual cancer patient may access information management apparatus 100 from terminal device 31 thereof via a communication line to refer to (browse) various kinds of information. At this time, all the pieces of attribute information of each cancer patient are required to be anonymized, as described above. Each cancer patient (and his/her family) can perform a necessary authentication step or the like to refer to various kinds of information on the cancer patient.

3. Various Aspects

Information management apparatus 100 according to the embodiment described above is installed with the following computer program. A computer program according to an aspect of the present disclosure "causes at least one processor, when executed, to perform operations including acquiring first time information and second time information, the first time information being related to a time taken to acquire a predetermined amount of at least one or more specific nucleic acids based on a first cell acquired from a cancer patient, the second time information being related to a time taken to culture a second cell different from the first cell until a predetermined amount is reached; and storing individual patient information in which the first time information and the second time information are associated with attribute information of the cancer patient".

An information management method executed by information management apparatus 100 according to an embodiment of the present disclosure is "an information management method executable by at least one processor that executes computer-readable instructions, the information management method including, by the at least one processor executing the instructions, acquiring first time information related to a time taken to acquire a predetermined amount of at least one or more specific nucleic acids based on a first cell acquired from a cancer patient; acquiring second time information related to a time taken to culture a second cell different from the first cell until a predetermined amount is reached; and storing individual patient information in which the first time information and the second time information are associated with attribute information of the cancer patient".

Information management system 1 including information management apparatus 100 according to an embodiment of the present disclosure is "an information management system including a first terminal device configured to acquire first time information related to a time taken to acquire a predetermined amount of at least one or more specific nucleic acids based on a first cell acquired from a cancer patient; a second terminal device configured to acquire second time information related to a time taken to culture a second cell different from the first cell until a predetermined amount is reached; and a third terminal device connectable to the first terminal device and the second terminal device via a communication line and configured to store individual patient information in which the first time information and the second time information are associated with attribute information of the cancer patient".

The present disclosure is based on and claims the benefit of priority from the following Japanese patent application. Also, the entire contents of the following Japanese patent application are hereby incorporated by reference.

(1) Japanese Patent Application No. 2021-59960, filed Mar. 31, 2021, entitled "Information Management Apparatus and Computer Program"

All the documents, patent applications, and technical standards referred to herein are hereby incorporated in their entirety by reference.

The invention claimed is:

1. An information management apparatus comprising at least one processor configured to:
   acquire first time information and second time information for a plurality of cancer patients, respectively,
   the first time information being related to a time taken to acquire a predetermined amount of at least one or more specific nucleic acids based on a first cell acquired from each of the plurality of cancer patients, and
   the second time information being related to a time taken to culture a second cell acquired from the each of the plurality of cancer patients, which is different from the first cell, until a predetermined amount is reached;
   store individual patient information in which the first time information and the second time information are associated with attribute information of the each of the plurality of cancer patients, respectively;
   acquire first correlation information and second correlation information based on a plurality of pieces of the stored individual patient information,
   the first correlation information being related to a correlation between the first time information and the attribute information, and
   the second correlation information being related to a correlation between the second time information and the attribute information;
   acquire a first prediction value related to the first time information and a second prediction value related to the second time information of a new cancer patient, based on the attribute information of the new cancer patient and the first correlation information and the second correlation information; and
   generate and output at least a portion of a treatment schedule of the new cancer patient, based on the first prediction value and the second prediction value, wherein:
   the first time information includes at least one of first detailed time information or second detailed time information, the first detailed time information being related to a time taken to culture the first cell until a predetermined amount is reached, the second detailed time information being related to a time taken to synthesize the at least one or more specific nucleic acids contained in the first cell until a predetermined amount is reached,
   the first correlation information is acquired by using a first neural network and a second neural network wherein:
      the first neural network is trained by first training data including:
         (1-i) the attribute information of the each of the plurality of cancer patients as first input values; and
         (1-ii) the first detailed time information associated with the each of the plurality of cancer patients as first output values, and
      the second neural network is trained by second training data including:
         (2-i) the attribute information of the each of the plurality of cancer patients as second input values; and
         (2-ii) the second detailed time information associated with the each of the plurality of cancer patients as second output values, and
   the second correlation information is acquired by using a third neural network trained by third training data including:
      (3-i) the attribute information of the each of the plurality of cancer patients as third input values; and
      (3-ii) the second time information associated with the each of the plurality of cancer patients as third output values.

2. The information management apparatus according to claim 1, wherein the attribute information includes at least one selected from the group consisting of age information, cancer type information, information on an amount of the first cell acquired, immune information of the each of the plurality of cancer patients, and cancer progression information.

3. The information management apparatus according to claim 1, wherein the first cell is an immunocompetent cell contained in a cancer tissue.

4. The information management apparatus according to claim 3, wherein the first cell is at least one or more selected from the group consisting of a T cell, a B cell, a dendritic cell, and a macrophage.

5. The information management apparatus according to claim 1, wherein the second cell is a cell acquired from each of the plurality of cancer patients.

6. The information management apparatus according to claim 1, wherein the second cell is at least one or more selected from the group consisting of a T cell, a B cell, a dendritic cell, and a macrophage.

7. The information management apparatus according to claim 1, wherein the first correlation information includes at least one of first detailed correlation information or second detailed correlation information, the first detailed correlation information being related to a correlation between the attribute information and first detailed time information related to a time taken to culture the first cell until a predetermined amount is reached, the second detailed correlation information being related to a correlation between the attribute information and second detailed time information related to a time taken to synthesize the at least one or more specific nucleic acids contained in the first cell until a predetermined amount is reached.

8. The information management apparatus according to claim 1, wherein the first prediction value includes at least one of a first detailed prediction value or a second detailed prediction value,
   the first detailed prediction value being calculated based on the attribute information of the new cancer patient and first detailed correlation information, the first detailed correlation information being related to a correlation between the attribute information and first detailed time information related to a time taken to culture the first cell until a predetermined amount is reached, the first detailed prediction value being related to the first detailed time information of the new cancer patient,
   the second detailed prediction value being calculated based on the attribute information of the new cancer patient and second detailed correlation information, the second detailed correlation information being related to a correlation between the attribute information and second detailed time information related to a time taken to synthesize the at least one or more specific nucleic acids contained in the first cell until a predetermined amount is reached, the second detailed prediction value being related to the second detailed time information of the new cancer patient.

9. The information management apparatus according to claim 1, wherein the at least one processor is configured to transmit the first prediction value and the second prediction value, via a communication network, to at least one of a terminal device of the new cancer patient or a terminal device in a medical institution that treats the new cancer patient.

10. The information management apparatus according to claim 1, wherein the at least one processor is configured to transmit the at least the portion of the treatment schedule, via a communication network, to at least one of a terminal device of the new cancer patient or a terminal device in a medical institution that treats the new cancer patient.

11. The information management apparatus according to claim 1, wherein:
the first time information is provided from a first institute,
the second time information is provided from a second institute different from the first institute, and
the portion of the treatment schedule is transmitted to the first institute and the second institute via a communication network.

12. The information management apparatus according to claim 1, wherein the attribute information includes age information, cancer type information, information on an amount of the first cell acquired, and immune information of the each of the plurality of cancer patients.

13. A non-transitory computer-readable recording medium having recorded thereon a computer program for causing at least one processor, when executed, to perform operations comprising:
acquiring first time information and second time information for a plurality of cancer patients, respectively,
the first time information being related to a time taken to acquire a predetermined amount of at least one or more specific nucleic acids based on a first cell acquired from each of the plurality of cancer patients,
the second time information being related to a time taken to culture a second cell acquired from the each of the plurality of cancer patients, which is different from the first cell, until a predetermined amount is reached;
storing individual patient information in which the first time information and the second time information are associated with attribute information of the each of the plurality of cancer patients, respectively;
acquiring first correlation information and second correlation information based on a plurality of pieces of the stored individual patient information,
the first correlation information being related to a correlation between the first time information and the attribute information, and
the second correlation information being related to a correlation between the second time information and the attribute information;
acquiring a first prediction value related to the first time information and a second prediction value related to the second time information of a new cancer patient, based on the attribute information of the new cancer patient and the first correlation information and the second correlation information; and
generating and outputting at least a portion of a treatment schedule of the new cancer patient, based on the first prediction value and the second prediction value,
wherein:
the first time information includes at least one of first detailed time information or second detailed time information, the first detailed time information being related to a time taken to culture the first cell until a predetermined amount is reached, the second detailed time information being related to a time taken to synthesize the at least one or more specific nucleic acids contained in the first cell until a predetermined amount is reached,
the first correlation information is acquired by using a first neural network and a second neural network wherein:
the first neural network is trained by first training data including:
(1-i) the attribute information of the each of the plurality of cancer patients as first input values; and
(1-ii) the first detailed time information associated with the each of the plurality of cancer patients as first output values, and
the second neural network is trained by second training data including:
(2-i) the attribute information of the each of the plurality of cancer patients as second input values; and
(2-ii) the second detailed time information associated with the each of the plurality of cancer patients as second output values, and
the second correlation information is acquired by using a third neural network trained by third training data including:
(3-i) the attribute information of the each of the plurality of cancer patients as third input values; and
(3-ii) the second time information associated with the each of the plurality of cancer patients as third output values.

14. A method, comprising:
acquiring, by at least one processor, first time information and second time information for a plurality of cancer patients, respectively,
the first time information being related to a time taken to acquire a predetermined amount of at least one or more specific nucleic acids based on a first cell acquired from each of the plurality of cancer patients,
the second time information being related to a time taken to culture a second cell acquired from the each of the plurality of cancer patients, which is different from the first cell, until a predetermined amount is reached;
storing, by the at least one processor, individual patient information in which the first time information and the second time information are associated with attribute information of the each of the plurality of cancer patients, respectively;
acquiring, by the at least one processor, first correlation information and second correlation information based on a plurality of pieces of the stored individual patient information,
the first correlation information being related to a correlation between the first time information and the attribute information, and
the second correlation information being related to a correlation between the second time information and the attribute information;
acquiring, by the at least one processor, a first prediction value related to the first time information and a second prediction value related to the second time information of a new cancer patient, based on the attribute information of the new cancer patient and the first correlation information and the second correlation information; and generating and outputting, by the at least one processor, at least a portion of a treatment schedule of the new cancer patient, based on the first prediction value and the second prediction value, wherein:

the first time information includes at least one of first detailed time information or second detailed time information, the first detailed time information being related to a time taken to culture the first cell until a predetermined amount is reached, the second detailed time information being related to a time taken to synthesize the at least one or more specific nucleic acids contained in the first cell until a predetermined amount is reached, the first correlation information is acquired by using a first neural network and a second neural network wherein:
the first neural network is trained by first training data including:
(1-i) the attribute information of the each of the plurality of cancer patients as first input values; and
(1-ii) the first detailed time information associated with the each of the plurality of cancer patients as first output values, and the second neural network is trained by second training data including:
(2-i) the attribute information of the each of the plurality of cancer patients as second input values; and
(2-ii) the second detailed time information associated with the each of the plurality of cancer patients as second output values, and the second correlation information is acquired by using a third neural network trained by third training data including:
(3-i) the attribute information of the each of the plurality of cancer patients as third input values; and
(3-ii) the second time information associated with the each of the plurality of cancer patients as third output values.

15. The method according to claim 14, further comprising providing a treatment on the new patient according to the portion of a treatment schedule.

* * * * *